(12) United States Patent
Roepke et al.

(10) Patent No.: US 8,729,731 B2
(45) Date of Patent: May 20, 2014

(54) BATTERY BACKUP SYSTEM, METHOD OF USE, AND METHOD OF MANUFACTURING

(75) Inventors: Jon Roepke, Redondo Beach, CA (US); Eugene Vosicher, North Hollywood, CA (US)

(73) Assignee: Belkin International, Inc., Playa Vista, CA (US)

( * ) Notice: Subject to any disclaimer, the term of this patent is extended or adjusted under 35 U.S.C. 154(b) by 537 days.

(21) Appl. No.: 12/938,369

(22) Filed: Nov. 2, 2010

(65) Prior Publication Data

US 2011/0101781 A1 May 5, 2011

Related U.S. Application Data

(60) Provisional application No. 61/257,414, filed on Nov. 2, 2009.

(51) Int. Cl.
*H02J 7/00* (2006.01)

(52) U.S. Cl.
USPC ............. 307/64; 307/65; 307/66; 320/107; 320/137; 320/138

(58) Field of Classification Search
USPC ............. 307/64–66; 320/107, 137–138
See application file for complete search history.

(56) References Cited

U.S. PATENT DOCUMENTS

| | | | | |
|---|---|---|---|---|
| 6,144,187 A | * | 11/2000 | Bryson | 320/137 |
| 2008/0179956 A1 | * | 7/2008 | Jiang et al. | 307/66 |
| 2008/0203972 A1 | * | 8/2008 | Sather et al. | 320/137 |
| 2009/0027013 A1 | | 1/2009 | Odaohhara | |

FOREIGN PATENT DOCUMENTS

| | | |
|---|---|---|
| CN | 200990520 | 12/2007 |
| CN | 101309014 | 11/2008 |
| JP | 2001086658 | 3/2001 |

OTHER PUBLICATIONS

International Search Report and Written Opinion from PCT/US2010/55188; Jan. 4, 2011; 15 pages.

* cited by examiner

*Primary Examiner* — Jared Fureman
*Assistant Examiner* — Alfonso Perez Borroto
(74) *Attorney, Agent, or Firm* — Bryan Cave LLP

(57) ABSTRACT

Some embodiments include an electrical system. In many embodiments, the electrical system can comprise a system input configured to receive a first power signal from an external power source. In the same or different embodiments, the first power signal can comprise a first voltage. In the same or different embodiments, the electrical system can comprise a system output electrically coupled to the system input. In the same or different embodiments, the electrical system can comprise a charger module electrically coupled to the system input. In the same or different embodiments, the electrical system can comprise a resistive component coupled between the system input and the system output. In the same or different embodiments, the electrical system can comprise a power storage device electrically coupled to the system output and to the charger module. In the same or different embodiments, the electrical system can comprise a sense circuit electrically coupled across the resistive component and electrically coupled to the charger module. Other embodiments are disclosed.

38 Claims, 7 Drawing Sheets

BATTERY BACKUP SYSTEM, METHOD OF USE, AND METHOD OF MANUFACTURING

CROSS-REFERENCE TO RELATED APPLICATIONS

This application claims the benefit of U.S. Provisional Application No. 61/257,414, filed Nov. 2, 2009. U.S. Provisional Application No. 61/257,414, filed Nov. 2, 2009, is also incorporated herein by reference.

FIELD OF THE INVENTION

This invention relates generally to electrical systems, and relates more particularly to electrical systems for providing uninterruptible power for electronic devices and methods of using the same.

DESCRIPTION OF THE BACKGROUND

Continuing development in voice over Internet protocols is creating increasing commercial and consumer interest in Internet telephony. Many governments require telephone providers to provide an uninterruptible emergency number service for the event of an emergency. Because Internet protocol networks, unlike conventional telephone networks, generally are not configured to provide sufficient power to operate a phone in the event of a power outage, many Internet telephony providers need a reliable alternative by which to power an Internet protocol telephone in the event of an emergency.

At the same time, Internet telephone providers frequently already manufacture a variety of Internet related electronic devices for which designs are already engineered and for which their factories are already tooled. Accordingly, it is generally undesirable to have to engineer and retool new systems that can provide both access to Internet protocol networks while also providing uninterruptible power for emergency Internet telephony.

Accordingly, a need or potential for benefit exists for an apparatus or system that allows incorporation of uninterruptible power systems into existing systems for providing Internet telephony. Meanwhile, such an apparatus or system would be equally beneficial for usage with any number of other existing electronic devices and systems.

BRIEF DESCRIPTION OF THE DRAWINGS

To facilitate further description of the embodiments, the following drawings are provided in which.

Figure 1:
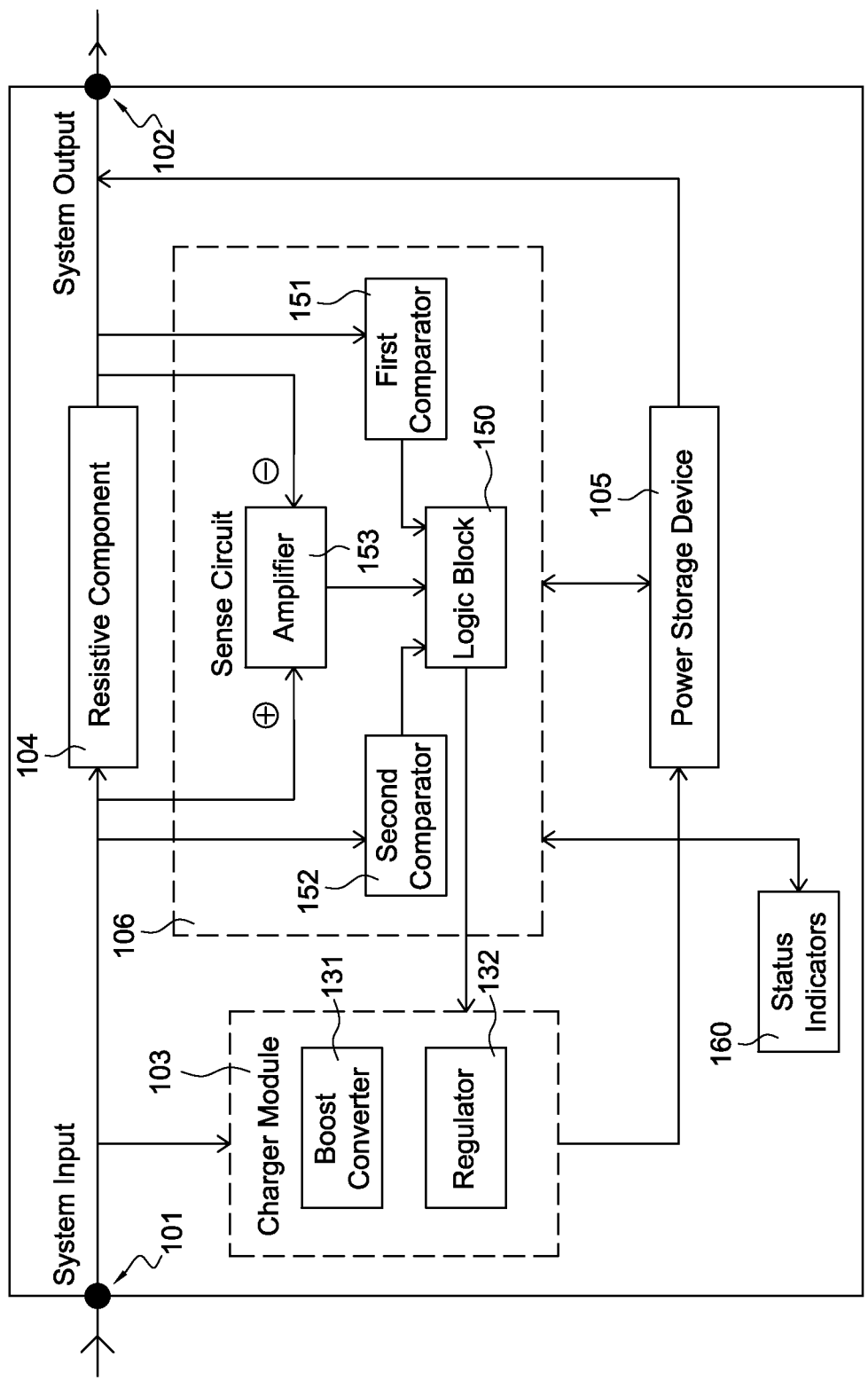
FIG. 1 illustrates a block diagram of an embodiment of an exemplary electrical system.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include an electrical system. In many embodiments, the electrical system can comprise a system input configured to receive a first power signal from an external power source. In the same or different embodiments, the first power signal can comprise a first voltage. In the same or different embodiments, the electrical system can comprise a system output electrically coupled to the system input. In the same or different embodiments, the electrical system can comprise a charger module electrically coupled to the system input. In the same or different embodiments, the electrical system can comprise a resistive component coupled between the system input and the system output. In the same or different embodiments, the electrical system can comprise a power storage device electrically coupled to the system output and to the charger module. In the same or different embodiments, the electrical system can comprise a sense circuit electrically coupled across the resistive component and electrically coupled to the charger module.

Other embodiments can include a method of manufacturing an electrical system. In many embodiments, the method can comprise: providing a system input configured to receive a first power signal from an external power source, wherein the first power signal comprises a first voltage; providing a system output; providing a charger module; providing a resistive component; providing a power storage device; providing a sense circuit; coupling the system input to the charger module and the resistive component; coupling the charger module to the power storage device; coupling the resistive component and the power storage device to the output; coupling the sense circuit to the system input and the system output such that the resistive component is disposed between a first coupling point where the sense circuit is coupled to the system input and a second coupling point where the sense circuit is coupled to the system output; and coupling the sense circuit to the charger module.

Further embodiments can include a method of using an electrical system. In many embodiments, the method can comprise: receiving a first power signal at a system input of the electrical system, the first power signal comprising a first voltage; transmitting at least a first portion of the first power signal across a resistive component to a system output of the electrical system; comparing an output voltage at the system output and a first reference voltage; if at least the output voltage is greater than the first reference voltage, using at least a second portion of the first power signal to charge a power storage device; and if the first power signal received at the system input of the electrical system is interrupted, using the power storage device to provide power to the system output.

FIG. 1 is a block diagram of an embodiment of an exemplary electrical system 100. Electrical system 100 is merely exemplary and is not limited to embodiments presented herein. Electrical system 100 can be implemented in many different embodiments or examples not presented herein.

Referring to FIG. 1, in many embodiments, electrical system 100 can comprise a system input 101. In the same or different embodiments, system input 101 can be configured to receive a first power signal from an external power source 210, as described below with reference to FIG. 2. In the same or different embodiments, electrical system 100 can comprise a system output 102 electrically coupled to system input 101.

Referring again to FIG. 1, in the same or different embodiments, electrical system 100 can comprise a charger module 103 electrically coupled to system input 101. In many embodiments, charger module 103 can comprise a boost converter 131. In the same or different embodiments, boost converter 131 can be configured to transform the first power signal to a second power signal. In the same or different embodiments, charger module 103 can comprise a regulator 132. In the same or different embodiments, regulator 132 can be configured to regulate the passage of electrical current through regulator 132. As an example, regulator 132 can use all or only part of the current from the first power signal for the second power signal.

In some embodiments, the first power signal can comprise a first voltage. In various embodiments, the second power signal can comprise a second voltage different from the first voltage. In some embodiments, the first voltage comprises approximately 12 volts, and the second voltage comprises approximately 14 volts. In other embodiments, the first voltage comprises approximately 12 volts, and the second voltage comprises approximately 18 volts. In still other embodiments, the first voltage comprises approximately 12 volts and the second voltage comprises approximately 20 volts. In these various embodiments, boost converter 131 increases the voltage of the first power signal to the second power signal.

In the same or different embodiments, electrical system 100 can comprise a resistive component 104 coupled between system input 101 and system output 102. In the same or different embodiments, resistive component 104 can comprise a wire. In other embodiments, resistive component 104 can comprise at least one resistor. In the same or different embodiments, where resistive component 104 comprises multiple resistors, the resistors can be configured in a series or a parallel configuration, or both. In various embodiments, resistive component 104 can comprise any suitable resistance having a resistance of greater than a few milliohms.

Resistive component 104 can comprise a resistive component input voltage and a resistive component input current. In some embodiments, the resistive component input voltage can be the same as the first voltage or input voltage of the first power signal, and the resistive component input current can be all or part of a first current or input current of the first power signal. In the same or different embodiments, resistive component 104 can comprise a resistive component output voltage and a resistive component output current. In some embodiments, the resistive component output voltage can comprise at least a portion of the first voltage and can be the same as the output voltage at system output 102. Also, in the same or different embodiments, the resistive component output current can be all or part of the first current of the first power signal and can be the same as the output current or second current at system output 102.

In the same or different embodiments, electrical system 100 can comprise a power storage device 105 electrically coupled to system output 102 and to charger module 103. In many embodiments, power storage device 105 can be configured to receive at least a portion of the second power signal from charger module 103. In some embodiments, power storage device 105 can be configured to output a third power signal. In some embodiments, power storage device 105 can comprise any battery, such as, for example, a lead acid battery available from Yuasa Battery, Inc. of Laureldale, Pa., USA. In other embodiments, power storage device 105 can comprise a nickel cadmium battery. In still other embodiments, power storage device 105 can comprise a lithium ion battery.

In the same or different embodiments, electrical system 100 can comprise a sense circuit 106 electrically coupled across resistive component 104 and electrically coupled to charger module 103. In many embodiments, sense circuit 106 can be configured to measure at least one measurement of an electrical difference across resistive component 104. In some embodiments, the electrical difference comprises at least one of a voltage difference or a current difference. In the same or different embodiments, sense circuit 106 can provide at least one control signal to regulator 132 based on the at least one measurement.

Still referring to FIG. 1, in many embodiments, sense circuit 106 can comprise a logic block or logic unit 150 and a first comparator 151. In some embodiments, first comparator 151 can be configured to compare the output voltage and a first reference voltage and to provide a first comparator signal based on a first voltage relationship of the output voltage and the first reference voltage. In other embodiments, first comparator 151 can be configured to compare the resistive component output voltage and the first reference voltage and to provide the first comparator signal based on a first voltage relationship of the resistive component voltage and the first reference voltage. In still other embodiments, first comparator 151 can be configured to compare a portion of the input voltage to the first reference voltage and to provide the first comparator signal based on a first voltage relationship of the resistive component voltage and the first reference voltage.

In the same or different embodiments, logic unit 150 can be configured to receive the first comparator signal and to provide the at least one control signal to regulator 132 based on at least the first comparator signal. In some embodiments, the first reference voltage can comprise a first preset voltage greater than or equal to approximately 11.4 volts and less than or equal to approximately 12.6 volts. In other embodiments, the first reference voltage can comprise a different preset voltage constrained between a band of about plus or minus five percent (±5%) of a predefined central voltage. In many embodiments, first comparator 151 can be configured to have a built-in hysteresis.

Referring again to FIG. 1, in some embodiments, sense circuit 106 can further comprise a second comparator 152. In some embodiments, second comparator 152 can be configured to compare the first voltage and a second reference voltage and to provide a second comparator signal based on a second voltage relationship of the first voltage and the second reference voltage. In other embodiment, second comparator 152 can be configured to compare the input voltage and the second reference voltage and to provide the second comparator signal based on a second voltage relationship of the input voltage and the second reference voltage. In still other embodiments, second comparator 152 can be configured to compare the resistive component input voltage and the second reference voltage and to provide a second comparator signal based on a second voltage relationship of the resistive component input voltage and the second reference voltage.

In the same or different embodiments, logic unit 150 can be configured to receive the second comparator signal and to provide the at least one control signal to regulator 132 based on at least the second comparator signal. In some embodiments, the first and second reference voltages can be the same. For example, the second reference voltage can comprise a second preset voltage greater than or equal to approximately 11.4 volts and less than or equal to approximately 12.6 volts. As another example, the first reference voltage can comprise a different preset voltage constrained between a band of about plus or minus five percent (±5%) of a predefined central voltage. In many embodiments, the second reference voltage can be slightly greater (i.e, five to twenty percent greater) than the first reference voltage. In many embodiments, second comparator 152 can be configured to have a built-in hysteresis.

Referring back to FIG. 1, in many embodiments, sense circuit 106 can further comprise an amplifier 153. In some embodiments, amplifier 153 can be configured to compare the first current and the second current, and to provide an amplifier ratio signal based on a current relationship of the first current and the second current. In other embodiments, amplifier 153 can be configured to compare the input current and the output current, and to provide an amplifier ratio signal based on a current relationship of the input current and the output current. In still other embodiments, amplifier 153 can be configured to compare the resistive component input current and the resistive component output current, and to provide an amplifier ratio signal based on a current relationship of the resistive component input current and the resistive component output current. In other embodiments, amplifier 153 can be configured to compare the input voltage, the first voltage, and/or the resistive component input voltage and the output voltage, the second voltage, the portion of the input or first voltage, and/or the resistive component output voltage, and to provide an amplifier ratio signal based on a third voltage relationship of the different voltages.

In many embodiments, the amplifier ratio signal can comprise a linear output. In the same or different embodiments, the value of the linear output can be inversely proportional to a value of the current relationship and/or the third voltage relationship. Furthermore, in the same or different embodiments, the gain of amplifier 153 can be inversely proportional to the magnitude of the resistance of resistive component 104. For example, amplifier 153 can have a higher gain when resistive component 104 has a lower resistance.

In the same or different embodiments, logic unit 150 can be configured to receive the amplifier ratio signal and to provide the at least one control signal to regulator 132 based on at least the amplifier ratio signal. In still other embodiments, sense circuit 106 can comprise a Hall effect device. In the same or different embodiments, the Hall effect device can perform similar functions to amplifier 153.

For some embodiments, Table 1 can provide an exemplary logic table for logic unit 150. Specifically, Table 1 can provide a logic table for embodiments of system 100 comprising first comparator 151, second comparator 152, and amplifier 153. In the same or different embodiments, the first and second comparator signals can comprise either high or low values with respect to their respective reference voltages, and the amplifier ratio signal can reflect whether or not there is a difference between the first current and the second current. Accordingly, the logical result computed by logic unit 150 for these various combinations are provided for the particular exemplary embodiments.

TABLE 1

| Comparator 151 | High | High | Low | High |
| Comparator 152 | High | High | High | Low |
| Amplifier 153 | No Change | Change | Change | Change |
| Logic | Charge | No Charge | No Charge | Charge |

In many embodiments, the at least one control signal can comprise at least one of a first instruction to provide the at least the portion of the second power signal to power storage device 105 to charge power storage device 105, or a second instruction of an amount of the at least the portion of the second power signal to provide to the power storage device 105 to charge power storage device 105.

In many embodiments, electrical system 100 can comprise a microcontroller. In the same or different embodiments, the microcontroller can be a computing device for running one or more algorithms to control some or all of the functionality of electrical system 100. In many embodiments, the microcontroller can be all or part of logic unit 150 and/or all or part of sense circuit 106. In the same or different embodiments, the microcontroller can control how and when power storage device 105 delivers the third power signal to system output 102, according to conventional techniques. In some embodiments, the microcontroller, and the associated algorithms running on the microcontroller, can allow for charging the system and operational flexibility when changes are required due to various power storage device capacities and/or where diverse chemistries. In some embodiments, the microcontroller can perform at least one algorithm that controls the charging process and/or controls at least one status indicator 160, as described below, so that electrical system 100 communicates with a user. In many embodiments, the microcontroller can run a power storage device self-test routine of power storage device 105 and/or analyze a power storage device condition of power storage device 105.

In many embodiments, system output 102 can be configured to receive at least one of at least a portion of the first power signal or the third power signal. In the same or different embodiments, system output 102 can be further configured to provide the at least one of the at least the portion of the first power signal or the third power signal to an electronic device 220, as described below with reference to FIG. 2. In still further embodiments, system output 102 can be configured to provide the at least one of the at least the portion of the first power signal or the third power signal to electronic device 220 (FIG. 2) and at least one other electronic device, as described below.

In the same or different embodiments, electrical system 100 can further comprise at least one status indicator 160. In the same or different embodiments, the at least one status indicator 160 can be at least one of a visual status indicator or an audible status indicator. In the same or different embodiments, the visual indicator can comprise a light emitting diode (LED). In the same or different embodiments, the audible indicator can comprise a sound (e.g., a buzzer). In many embodiments, the microcontroller can be configured to turn on the at least one status indicator 160 when system output 102 is receiving power from power storage device 105. In the same or different embodiments, the microcontroller can be configured to turn on the at least one status indicator 160 when power storage device 105 is receiving a charge from charger module 103, where this status indicator is different from the status indicator for when system output 102 is receiving power from power storage device 105. In the same or different embodiments, the microcontroller can be configured to turn on the at least one status indicator 160 when power storage device 105 is fully charged, where this status indicator can be different from the status indicators for when system output 102 is receiving power from power storage device 105 and when power storage device 105 is receiving a charge from charger module 103. In some embodiments, the microcontroller can be configured to turn on both a visual indicator and an audible indicator at the same time and/or for the same reason(s).

Figure 2:
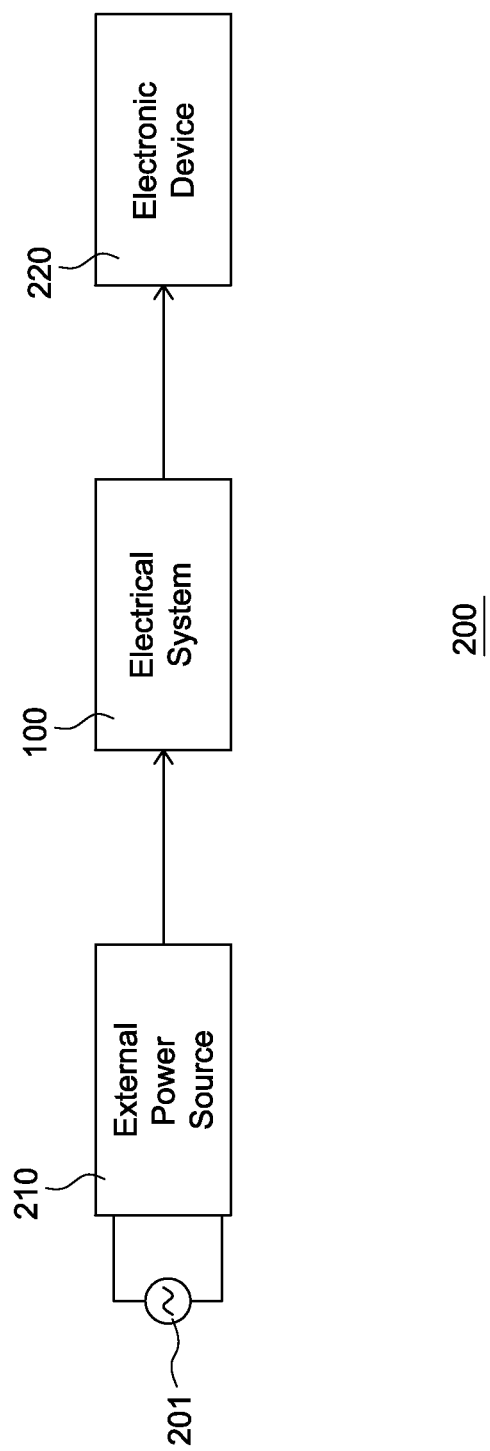
FIG. 2 illustrates a block diagram of a system incorporating the electrical system of FIG. 1, according to one embodiment.

Returning back to the drawings, FIG. 2 is a block diagram of a system 200 incorporating electrical system 100, according to one embodiment. In many embodiments, system 200 can be configured to provide power from a mains to a gateway. In the same or different embodiments, the power can comprise general-purpose alternating current (AC) electric power. System 200 is merely exemplary and is not limited to the embodiments presented herein. System 200 can be employed in many different embodiments or examples not specifically depicted or described herein.

Referring to FIG. 2, in many embodiments, system 200 can comprise mains 201 supplying an AC power signal to external power source 210. In the same or different embodiments, external power source 210 can be configured to convert the AC power signal into an appropriate direct current (DC) power signal based on the load as defined by the power needs of electronic device 220 and electrical system 100. Electronic device 220 is separate from electrical system 100. In some embodiments, the DC power signal can change if the load changes, but can remain constant if the load remains constant. In many embodiments, external power source 210 can deliver the DC power signal to electrical system 100. In the same or different embodiments, electrical system 100 can pass a portion of the DC power signal on to electronic device 220 based on the load requirements of electronic device 220. In some embodiments, a portion of the received DC power signal can be passed to electrical system 100 to be stored in the power storage device 105 of electrical system 100.

In the same or different embodiments, in the event of a failure of mains 101 supplying the AC power signal to external power source 210, electrical system 100 can be configured to supply a DC power signal to electronic device 220 based on the load requirements of electronic device 220 for a specified time or until power reserves in power storage device 105 are exhausted. As described above, the DC power signal can be transmitted to electronic device 220 to permit electronic device 220 to provide the aforementioned functionality.

Figure 3:
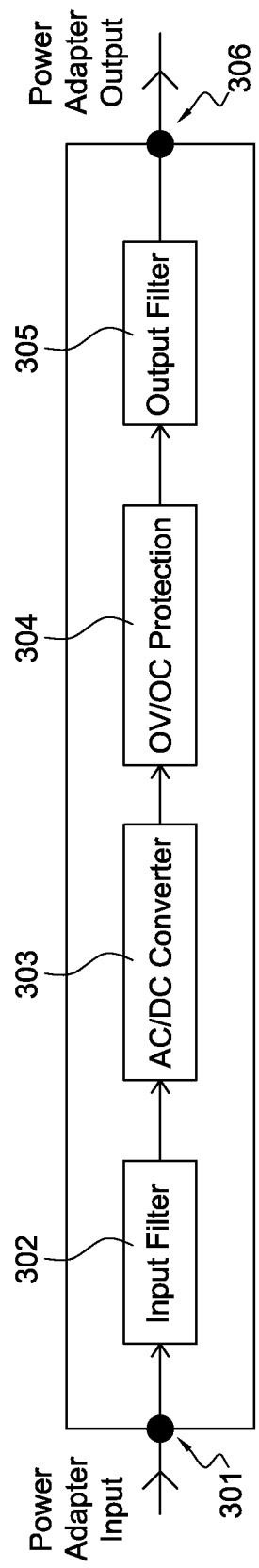
FIG. 3 illustrates a block diagram of an architecture of the power adapter of FIG. 2, according to one embodiment.

Returning again to the drawings, in the same or different embodiments, external power source 210 can comprise a power adapter 300, a block diagram for which is illustrated in FIG. 3. Referring now to FIG. 3, power adapter 300 can comprise power adapter input 301, input filter 302, AC to DC (AC/DC) converter 303, overvoltage/overcurrent (OV/OC) protector 304, output filter 305, and power adapter output 306. In some embodiments, input filter 302 can be configured to receive an AC power signal from input 301. In the same or different embodiments, input filter 302 can be configured to smooth the received AC power signal and to pass the smoothed AC power signal to AC/DC converter 303. In some embodiments, AC/DC converter 303 can be configured to convert the smoothed AC power signal to a DC power signal and to pass the DC power signal to OV/OC protector 304. In some embodiments, OV/OC protector 304 can be configured to receive the DC power signal. In the same or different embodiments, OV/OC protector 304 can be configured to ensure the DC power signal does not exceed a predetermined voltage and/or current level and to pass the DC power signal to output filter 305. In some embodiments, output filter 305 can be configured to receive the DC power signal from OV/OC protector 304. In the same or different embodiments, output filter 305 can be configured to smooth the received DC power signal and to pass the smoothed DC power signal to output 306 for delivery to electrical system 100.

In the same or different embodiments, power adapter 300 can be configured to receive an alternating current power signal. In the same or different embodiments, power adapter 300 can be configured to transform the alternating current power signal to a direct current power signal. In the same or different, power adapter 300 can be configured to provide the direct current power signal to the input of electrical system 100. In the same or different embodiments, the first power signal can comprise the direct current power signal.

In the same or different embodiments, power adapter 300 can be configured with a maximum power rating of approximately 3.5 amps of direct current at approximately 12 volts. In the same or different embodiments, the gateway can be configured with a maximum power requirement of approximately 3 amps of direct current at approximately 12 volts. In the same or different embodiments, power adapter 300 can be configured with a maximum current rating. In the same or different embodiments, the gateway can consume an average current. In the same or different embodiments, the average current can comprise between approximately 35 to 40 percent of the maximum current rating of the power adapter. In some embodiments, power adapter 300 can be implemented as any suitable power adapter or power supply, such as, for example, the MTR-07244 (part number: 1000-500033-001) available from 2Wire, Inc. of San Jose, Calif. In other embodiments, the gateway can be implemented as any suitable residential gateway, such as, for example, the model 3800 available from 2Wire, Inc. of San Jose, Calif.

In various embodiments, electronic device 220 can comprise the gateway. In the same or different embodiments, the gateway can be configured to provide at least one of a voice over internet protocol (VoIP) functionality, a modem functionality (e.g., cable modem, DSL modem, or network modem), a router functionality (e.g., wired or wireless), a network switch functionality, or a wireless access point (WAP) functionality. In some embodiments, the gateway can comprise a residential gateway. In other embodiments, the gateway can comprise a commercial gateway. In further embodiments, the gateway can comprise an industrial gateway. In still further embodiments, the gateway can comprise a retail gateway.

In other embodiments, where system output 102 is configured to provide the at least one of the at least the portion of the first power signal or the third power signal to electronic device 220 and at least one other electronic device, the at least one other electronic device can comprise a modem having VoIP. In some embodiments, where electronic device 220 is the gateway, but does not provide VoIP functionality, the modem having VoIP can provide a user with VoIP usage.

Figure 4:
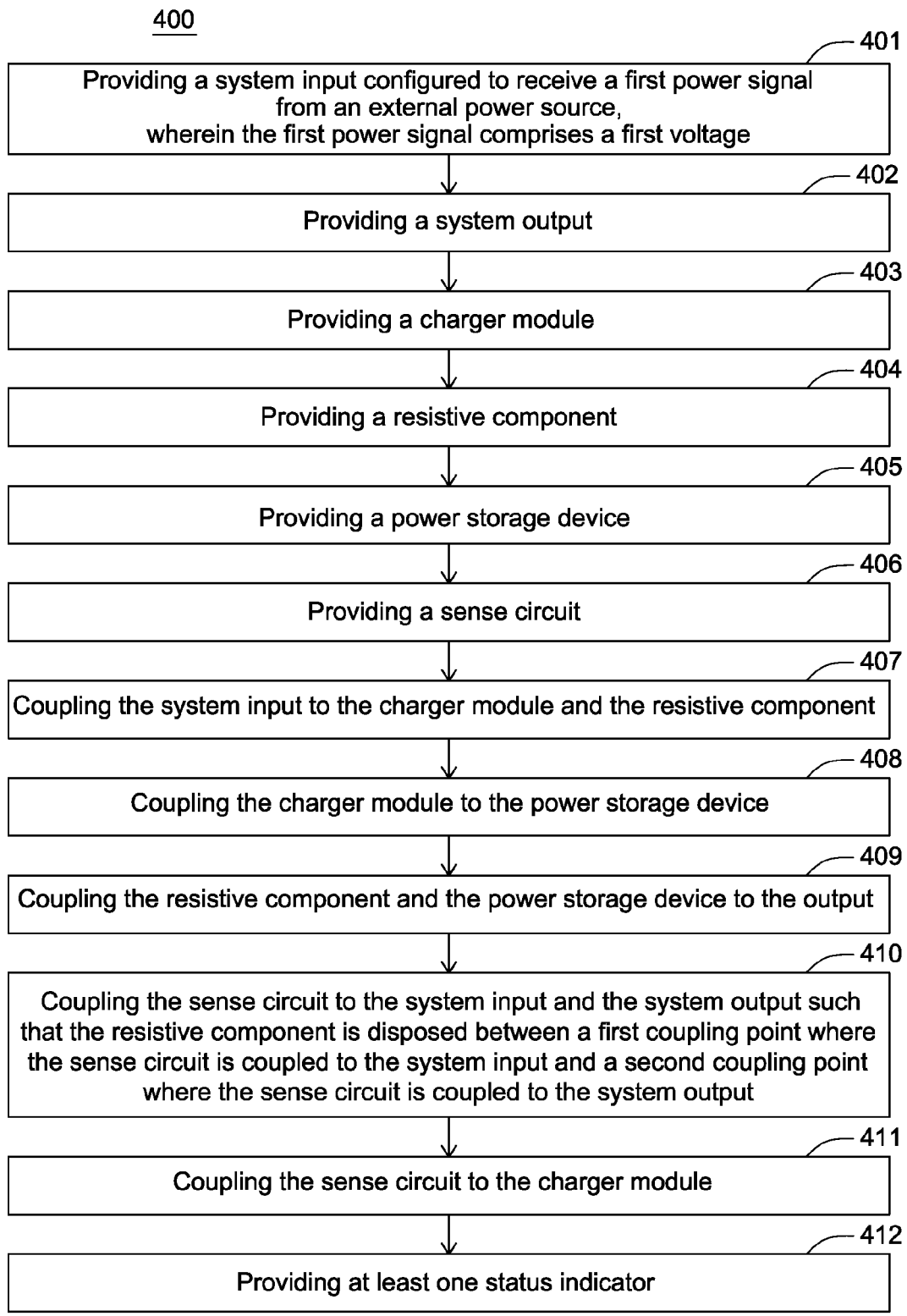
FIG. 4 is a flow chart illustrating an embodiment of a method of manufacturing an electrical system.

Returning once again to the drawings, FIG. 4 illustrates a flow chart for an embodiment of a method 400 of manufacturing an electrical system. Method 400 is merely exemplary and is not limited to the embodiments presented herein. Method 400 can be employed in many different embodiments or examples not specifically depicted or described herein. In some embodiments, the activities, the processes, and/or the procedures of method 400 can be performed in the order presented. In other embodiments, the activities, the processes, and/or the procedures of the method 400 can be performed in any other suitable order. In still other embodiments, one or more of the activities, the activities, the processes, and/or the procedures of the method 400 can be combined or skipped.

Referring to FIG. 4, in many embodiments, method 400 can comprise a procedure 401 of providing a system input configured to receive a first power signal from an external power source. In the same or different embodiments, the system input can be similar to system input 101 (FIG. 1), as described above. In some embodiments, the first power signal can comprise a first voltage and/or an input voltage and can also comprise a first current, an input current, and/or a resistive component input current.

Referring to FIG. 4, in many embodiments, method 400 can comprise a procedure 402 of providing a system output. In the same or different embodiments, the system output can be similar to system output 102 (FIG. 1), as described above. In some embodiments, the system output can be configured to receive at least a portion of the first power signal. In the same or different embodiments, the portion of the first power signal can comprise a resistive component output voltage or an output voltage, and can also comprise an output current, second current, and/or resistive component output current. In the same or different embodiments, the resistive component output voltage can comprise at least a portion of the first voltage.

Referring to FIG. 4, in many embodiments, method 400 can comprise a procedure 403 of providing a charger module. In many embodiments, the charger module can be similar to charger module 103 (FIG. 1), as described above. In the same or different embodiments, the charger module can comprise a boost converter configured to transform the first power signal to a second power signal. In the same or different embodiments, the second power signal can comprises a second voltage. In the same or different embodiments, the first voltage can comprise approximately 12 volts and the second voltage can comprise approximately 14 volts. In many embodiments, the charger module can comprises a regulator configured to regulate the passage of electrical current through the regulator.

Referring to FIG. 4, in many embodiments, method 400 can comprise a procedure 404 of providing a resistive component. In the same or different embodiments, the resistive component can be similar to resistive component 104 (FIG. 1), as described above.

Referring to FIG. 4, in many embodiments, method 400 can comprise a procedure 405 of providing a power storage device. In the same or different embodiments, the power storage device can be similar to power storage device 105 (FIG. 1), as described above.

Referring to FIG. 4, in many embodiments, method 400 can comprise a procedure 406 of providing a sense circuit. In the same or different embodiments, the sense circuit can be similar to sense circuit 106 (FIG. 1), as described above. In many embodiments, the sense circuit can be configured to measure at least one measurement of an electrical difference across the resistive component. In the same or different embodiments, the electrical difference can comprise at least one of a voltage difference or a current difference. In some embodiments, the sense circuit can be configured to measure at least one measurement of an electrical difference across the resistive component and to provide at least one control signal to the regulator of the charging module based on the at least one measurement. In the same or different embodiments, the control signal can comprise at least one of a first instruction to provide the at least the portion of the second power signal to the power storage device or a second instruction of an amount of the at least the portion of the second power signal to provide to the power storage device.

In many embodiments, the sense circuit can comprise a logic unit and a first comparator. In the same or different embodiments, the logic unit can comprise a microcontroller. In many embodiments, the logic unit can be similar to logic unit 150 (FIG. 1), as described above. In various embodiments, the first comparator can be similar to first comparator 151 (FIG. 1), as described above. In the same or different embodiments, the first comparator can be configured to compare the resistive component output voltage and a first reference voltage and to provide a first comparator signal based on a first voltage relationship of the resistive component output voltage and the first reference voltage. In some embodiments, the logic unit can be configured to receive the first comparator signal and to provide at least one control signal to the regulator based on at least the first comparator signal.

In further embodiments, the sense circuit can further comprise a second comparator. In many embodiments, the second comparator can be similar to second comparator 152 (FIG. 1), as described above. In the same or different embodiments, the second comparator can be configured to compare the first voltage and a second reference voltage and to provide a second comparator signal based on a second voltage relationship of the first voltage and the second reference voltage. In the same or different embodiments, the logic unit can be configured to receive the second comparator signal and to provide the at least one control signal to the regulator based on at least the second comparator signal.

In the same or different embodiments, the sense circuit can further comprise an amplifier. In many embodiments, the amplifier can be similar to amplifier 153 (FIG. 1), as described above. In still further embodiments, the first power signal can comprise a first current. In the same or different embodiments, the portion of the first power signal can comprise a second current. In the same or different embodiments, the amplifier can be configured to compare the first current and the second current and to provide an amplifier ratio signal based on a current relationship of the first current and the second current. In the same or different embodiments, the logic unit can be configured to receive the amplifier ratio signal and to provide the at least one control signal to the regulator based on at least the amplifier ratio signal.

Referring to FIG. 4, in many embodiments, method 400 can comprise a procedure 407 of coupling the system input to the charger module and the resistive component. In the same or different embodiments, method 400 can comprise a procedure 408 of coupling the charger module to the power storage device. In the same or different embodiments, method 400 can comprise a procedure 409 of coupling the resistive component and the power storage device to the output. In the same or different embodiments, method 400 can comprise a procedure 410 of coupling the sense circuit to the system input and the system output such that the resistive component is disposed between a first coupling point where the sense circuit is coupled to the system input and a second coupling point where the sense circuit is coupled to the system output. In the same or different embodiments, method 400 can comprise a procedure 411 of coupling the sense circuit to the charger module. In many embodiments, at least one of procedures 407-411 can be performed simultaneously with at least one other of procedure 407-411. In various embodiments, all of procedures 407-411 can be performed simultaneously with each other.

Referring to FIG. 4, in many embodiments, method 400 can further comprise procedure 412 of providing at least one status indicator. In the same or different embodiments, the at least one status indicator can be similar to the at least one status indicator 160, as described above.

Figure 5:
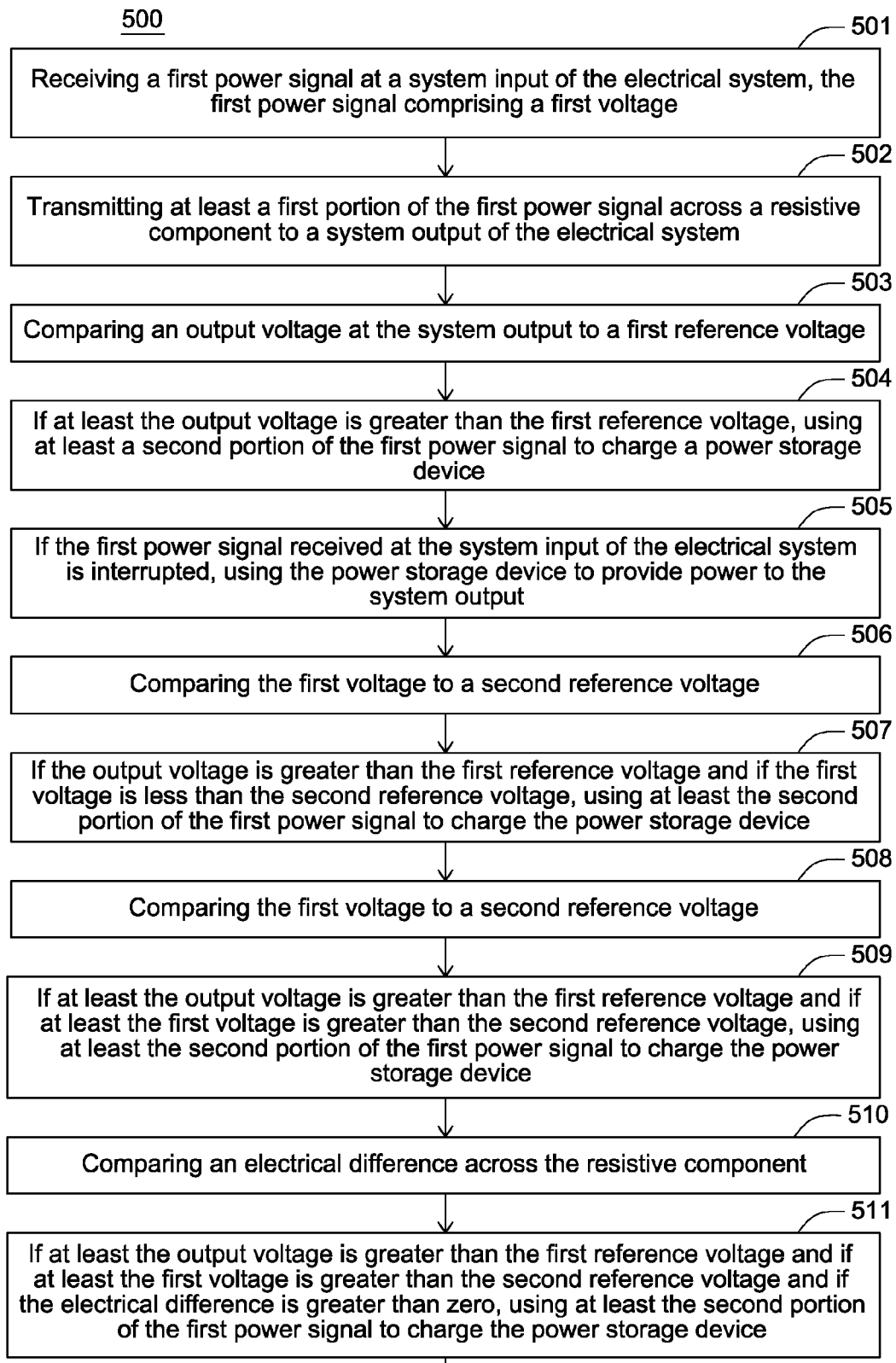
FIGS. 5-7 are a flow chart illustrating an embodiment of a method of using an electrical system.

Returning once again to the drawings, FIG. 5 illustrates a flow chart for an embodiment of a method 500 of using an electrical system. Method 500 is merely exemplary and is not limited to the embodiments presented herein. Method 500 can be employed in many different embodiments or examples not specifically depicted or described herein. In some embodiments, the activities, the processes, and/or the procedures of method 500 can be performed in the order presented. In other embodiments, the activities, the processes, and/or the procedures of the method 500 can be performed in any other suitable order. In still other embodiments, one or more of the activities, the activities, the processes, and/or the procedures of the method 500 can be combined or skipped.

Referring to FIG. 5, in many embodiments, method 500 can comprise a procedure 501 of receiving a first power signal at a system input of the electrical system, the first power signal comprising a first voltage. In the same or different embodiments, the system input can be similar to system input 101 (FIG. 1), as described above. In the same or different embodiments, the electrical system can be similar to electrical system 100 (FIG. 1), as described above.

Referring to FIG. 5, in many embodiments, method 500 can comprise a procedure 502 of transmitting at least a first portion of the first power signal across a resistive component to a system output of the electrical system. In the same or different embodiments, the resistive component can be similar to resistive component 104 (FIG. 1), as described above. In the same or different embodiments, the system output can be similar to system output 102 (FIG. 1), as described above.

Referring to FIG. 5, in many embodiments, method 500 can comprise a procedure 503 of comparing an output voltage at the system output (or a resistive component output voltage) and a first reference voltage. In the same or different embodiments, the first reference voltage can be similar to the first reference voltage of electrical system 100 (FIG. 1), as described above. In the same or different embodiments, method 500 can comprise a procedure 504 of using at least a second portion of the first power signal to charge a power storage device if at least the output voltage (or the resistive component output voltage) is greater than the first reference voltage. In the same or different embodiments, the power storage device can be similar to power storage device 105 (FIG. 1), as described above. In further embodiments, method 500 can comprise a procedure 505 of using the power storage device to provide power to the system output if the first power signal received at the system input of the electrical system is interrupted.

Referring to FIG. 5, in many embodiments, method 500 can comprise a procedure 506 of comparing the first voltage (or an input voltage or a resistive component input voltage) and a second reference voltage. In the same or different embodiments, the second reference voltage can be similar to the second reference voltage of electrical system 100 (FIG. 1), as described above. In the same or different embodiments, method 500 can further comprise a procedure 507 of using at least the second portion of the first power signal to charge the power storage device if at least the output voltage (or the resistive component output voltage) is greater than the first reference voltage and if the first voltage (or an input voltage or a resistive component input voltage) is less than the second reference voltage.

Referring to FIG. 5, in many embodiments, method 500 can comprise a procedure 508 of comparing the first voltage (or an input voltage or a resistive component input voltage) and the second reference voltage. In the same or different embodiments, method 500 can comprise a procedure 509 of using at least the second portion of the first power signal to charge the power storage device if at least the output voltage (or the resistive component output voltage) is greater than the first reference voltage and if at least the first voltage (or an input voltage or a resistive component input voltage) is greater than the second reference voltage.

Referring to FIG. 5, in many embodiments, method 500 can comprise a procedure 510 of comparing an electrical difference across the resistive component. In the same or different embodiments, method 500 can comprise a procedure 511 of using at least the second portion of the first power signal to charge the power storage device if at least the output voltage (or the resistive component output voltage) is greater than the first reference voltage and if at least the first voltage (or an input voltage or a resistive component input voltage) is greater than the second reference voltage and if the electrical difference is greater than zero.

Figure 6:
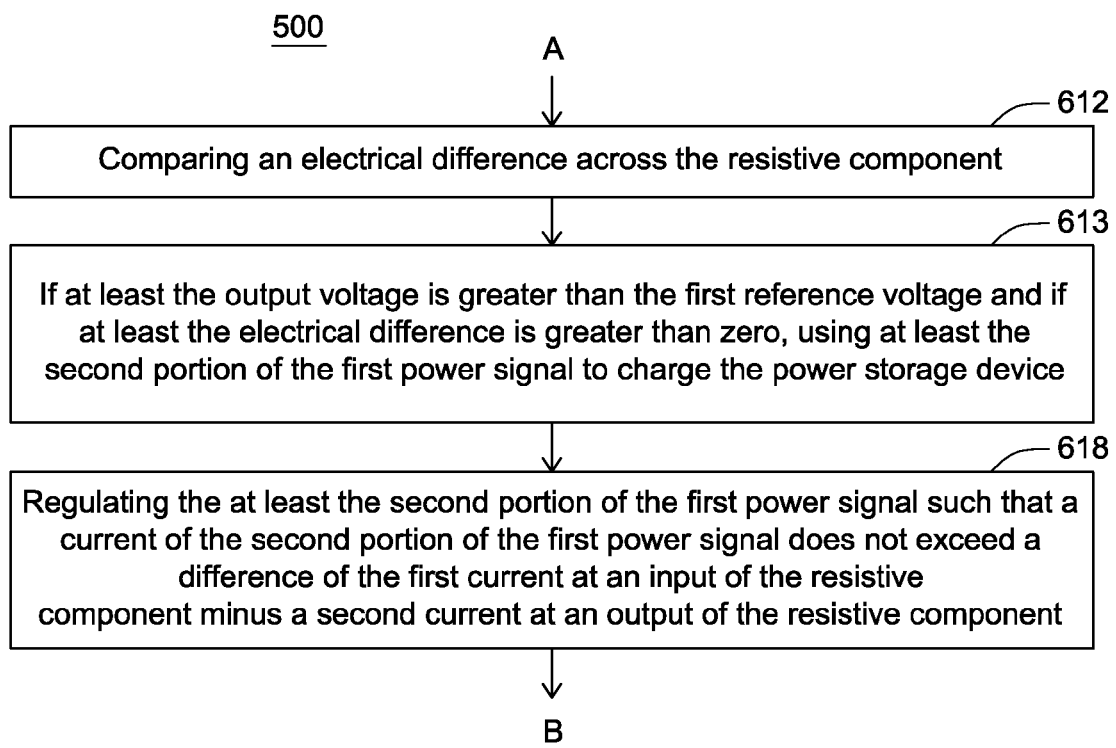

Referring now to FIG. 6, in many embodiments, method 500 can comprise a procedure 612 of comparing an electrical difference across the resistive component. In the same or different embodiments, method 500 can comprise a procedure 613 of using at least the second portion of the first power signal to charge the power storage device if at least the output voltage (or the resistive component output voltage) is greater than the first reference voltage and if at least the electrical difference is greater than zero.

Referring to FIG. 6, in many embodiments, method 500 can comprise a procedure 618 of regulating the at least the second portion of the first power signal such that a current of the second portion of the first power signal does not exceed a difference of the first current at an input of the resistive component minus a second current at an output of the resistive component.

Figure 7:
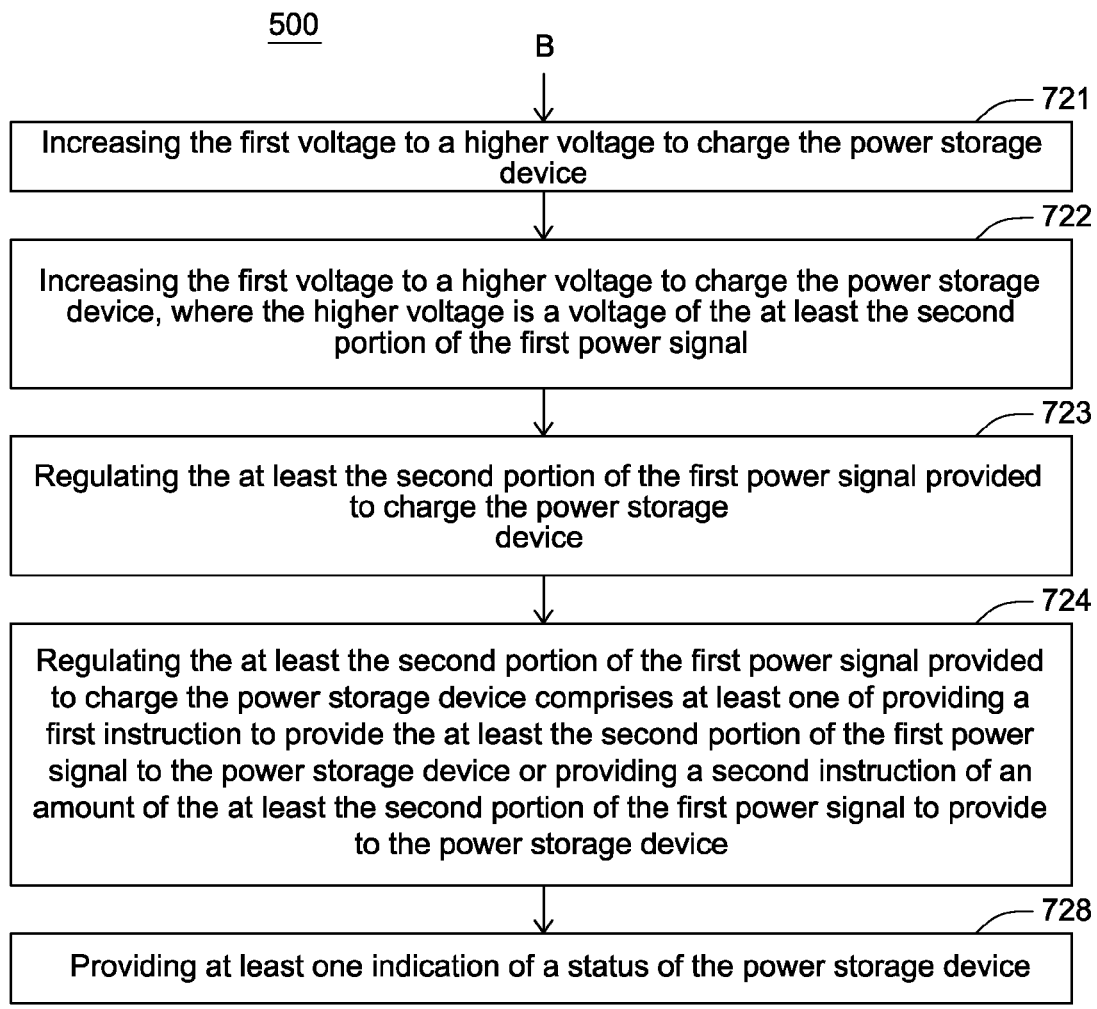

Referring now to FIG. 7, in many embodiments, method 500 can comprise a procedure 721 of increasing the first voltage to a higher voltage to charge the power storage device.

Referring to FIG. 7, in many embodiments, method 500 can comprise a procedure 722 of the method further comprises increasing the first voltage to a higher voltage to charge the power storage device. In many embodiments, the higher voltage can be a voltage of the at least the second portion of the first power signal. In the same or different embodiments, method 500 can comprise a procedure 723 of regulating the at least the second portion of the first power signal provided to charge the power storage device.

Referring to FIG. 7, in many embodiments, method 500 can comprise a procedure 724 of regulating the at least the second portion of the first power signal provided to charge the power storage device comprises at least one of providing a first instruction to provide the at least the second portion of the first power signal to the power storage device or providing a second instruction of an amount of the at least the second portion of the first power signal to provide to the power storage device.

Referring now to FIG. 7, in many embodiments, method 500 can comprise a procedure 728 of providing at least one indication of a status of the power storage device.

In some embodiments, all of the procedures of method 500 can occur simultaneously or sequentially. In many embodiments, a combination of procedures 503 and 504 of method 500 can occur in parallel and/or simultaneously with at least one other combination of procedures 506 and 507, procedures 508 and 509, procedures 510 and 511, or procedures 612, 613, and 618. In many embodiments, procedure 721 of method 500 can be part of at least one of procedures 504, 507, 509, 511, or 613. In the same or different embodiments, procedure 722 of method 500 can be part of at least one of procedures 504, 507, 509, 511, or 613. In many embodiments, procedure 723 of method 500 can be occur after or simultaneously with any of procedures 504, 507, 509, or 511. In many embodiments, procedure 724 of method 500 can be occur after or simultaneously with any of procedures 504, 507, 509, or 511.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 401-412 of FIG. 4, procedures 501-511 of FIG. 5, procedures 612, 613, and 618 of FIG. 6 and procedures 721, 722, 723, 724, and 725 of FIG. 7 may be comprised of many different activities and/or processes and be performed by many different modules, in many different orders, that any element of FIGS. 1-7 may be modified, and that the foregoing discussion of certain of these embodiments does not necessarily represent a complete description of all possible embodiments. As another example, in some embodiments, sense circuit 106 in FIG. 1 can include first comparator 151 and can not include one or more of second comparator 152 or amplifier 153. As a further example, in some embodiments, electrical system 100 can include an input filter similar to input filter 302 (FIG. 3), OV/OC protection similar to OV/OC protection 304 (FIG. 3), and/or an output filter similar to output filter 305 (FIG. 3).

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrical system comprising:
    a system input configured to receive a first power signal from an external power source, wherein the first power signal comprises a first voltage;
    a system output electrically coupled to the system input;
    a charger module electrically coupled to the system input;
    a resistive component coupled between the system input and the system output;
    a power storage device electrically coupled to the system output and to the charger module; and
    a sense circuit electrically coupled across the resistive component and electrically coupled to the charger module;
    wherein:
        the charger module comprises:
            a boost converter configured to transform the first power signal to a second power signal comprising a second voltage; and
            a regulator configured to regulate a passage of electrical current through the regulator;
        the power storage device is configured to receive at least a portion of the second power signal from the charger module and to output a third power signal;
        the system output is configured to receive at least one of: (i) at least a portion of the first power signal or (ii) the third power signal;
        the portion of the first power signal comprises a resistive component output voltage, and the resistive component output voltage comprises at least a portion of the first voltage;
        the sense circuit comprises a logic unit, a first comparator, and a second comparator;
        the first comparator is configured to compare the resistive component output voltage and a first reference voltage and to provide a first comparator signal based on a first voltage relationship of the resistive component output voltage and the first reference voltage;
        the second comparator is configured to compare the first voltage and a second reference voltage and to provide a second comparator signal based on a second voltage relationship of the first voltage and the second reference voltage; and
        the logic unit is configured to receive the first comparator signal and the second comparator signal and to provide at least one control signal to the regulator based on at least the first comparator signal and the second comparator signal.

2. The electrical system of claim 1 wherein:
    the system output is further configured to provide the at least one of the (i) at least the portion of the first power signal or (ii) the third power signal to an electronic device;
    the electronic device comprises a gateway; and
    the gateway is configured to provide at least one of a voice over internet protocol functionality, a modem functionality, a router functionality, a network switch functionality, or a wireless access point functionality.

3. The electrical system of claim 1 wherein:
the first reference voltage comprises a first preset voltage greater than or equal to approximately 11.4 volts and less than or equal to approximately 12.6 volts.

4. The electrical system of claim 1 wherein:
the second reference voltage comprises a second preset voltage greater than or equal to approximately 11.4 volts and less than or equal to approximately 12.6 volts.

5. The electrical system of claim 1 wherein:
the first power signal comprises a first current;
the portion of the first power signal comprises a second current;
the sense circuit further comprises an amplifier;
the amplifier is configured to compare the first current and the second current and to provide an amplifier ratio signal based on a current relationship of the first current and the second current; and
the logic unit is configured to receive the amplifier ratio signal and to provide the at least one control signal to the regulator based on at least the amplifier ratio signal.

6. The electrical system of claim 1 wherein:
the at least one control signal comprises at least one of (a) a first instruction to provide the at least the portion of the second power signal to the power storage device or (b) a second instruction to provide an amount of the at least the portion of the second power signal to the power storage device.

7. The electrical system of claim 1 wherein:
the sense circuit is configured to measure at least one measurement of an electrical difference across the resistive component; and
the sense circuit provides at least one control signal to the regulator based on the at least one measurement.

8. The electrical system of claim 7 wherein:
the electrical difference comprises at least one of a voltage difference or a current difference.

9. The electrical system of claim 1 wherein:
the first voltage comprises approximately 12 volts and the second voltage comprises approximately 14 volts.

10. The electrical system of claim 1 wherein:
the external power source comprises a power adapter configured to receive an alternating current power signal, to transform the alternating current power signal to a direct current power signal, and to provide the direct current power signal to the system input;
the first power signal comprises the direct current power signal;
the system output is electrically coupled to an electronic device; and
the electronic device comprises a gateway.

11. The electrical system of claim 10 wherein:
the power adapter is configured with a maximum power rating of approximately 3.5 amps of direct current at approximately 12 volts; and
the gateway is configured with a maximum power requirement of approximately 3 amps of direct current at approximately 12 volts.

12. The electrical system of claim 10 wherein:
the power adapter is configured with a maximum current rating;
the gateway consumes an average current; and
the average current comprises between approximately 35 to 40 percent of the maximum current rating.

13. The electrical system of claim 1 further comprising at least one status indicator configured to provide at least one indication of a status of the power storage device to a user of the electrical system.

14. The electrical system of claim 1 further comprising status indicators, wherein:
the sense circuit is electrically coupled to the system input and to the system output;
the sense circuit is configured to measure at least one measurement of an electrical difference across the resistive component;
the sense circuit provides the at least one control signal to the regulator based on the at least one measurement;
the system output is further configured to provide the at least one of the (i) at least the portion of the first power signal or (ii) the third power signal to an electronic device;
the electronic device comprises a residential gateway;
the residential gateway is configured to provide at least one of a voice over interne protocol functionality, a modem functionality, a router functionality, a network switch functionality, or a wireless access point functionality;
the external power source comprises a power adapter configured to receive an alternating current power signal, to transform the alternating current power signal to a direct current power signal, and to provide the direct current power signal to the system input;
the first power signal comprises the direct current power signal;
the electrical difference comprises a current difference;
the portion of the first power signal comprises a resistive component output voltage;
the resistive component output voltage comprises at least a portion of the first voltage;
the sense circuit further comprises an amplifier;
the first power signal comprises a first current, and the first current comprises the direct current power signal;
the portion of the first power signal comprises a second current;
the amplifier is configured to compare the first current and the second current and to provide an amplifier ratio signal based on a current relationship of the first current and the second current;
the logic unit is further configured to receive the amplifier ratio signal and to provide the at least one control signal to the regulator based on at least the amplifier ratio signal;
the logic unit comprises a microcontroller unit; and
the at least one control signal comprises at least one of (a) a first instruction to provide the at least the portion of the second power signal to the power storage device or (b) a second instruction to provide an amount of the at least the portion of the second power signal to the power storage device.

15. A method of manufacturing an electrical system, the method comprising:
providing a system input configured to receive a first power signal from an external power source, wherein the first power signal comprises a first voltage;
providing a system output;
providing a charger module comprising a boost converter and a regulator;
providing a resistive component;
providing a power storage device;
providing a sense circuit comprising a logic unit, a first comparator, and a second comparator;

coupling the system input to the charger module and the resistive component;

coupling the charger module to the power storage device;

coupling the resistive component and the power storage device to the system output; and coupling the sense circuit to the charger module, the system input, and the system output such that the resistive component is disposed between the system input and the system output;

wherein:
the boost converter is configured to transform the first power signal to a second power signal comprising a second voltage; and the regulator is configured to regulate a passage of electrical current through the regulator;

the power storage device is configured to receive at least a portion of the second power signal from the charger module and to output a third power signal;

the system output is configured to receive at least one of: (i) at least a portion of the first power signal or (ii) the third power signal;

the portion of the first power signal comprises a resistive component output voltage, and the resistive component output voltage comprises at least a portion of the first voltage;

the first comparator is configured to compare the resistive component output voltage and a first reference voltage and to provide a first comparator signal based on a first voltage relationship of the resistive component output voltage and the first reference voltage;

the second comparator is configured to compare the first voltage and a second reference voltage and to provide a second comparator signal based on a second voltage relationship of the first voltage and the second reference voltage; and the logic unit is configured to receive the first comparator signal and the second comparator signal and to provide at least one control signal to the regulator based on at least the first comparator signal and the second comparator signal.

16. The method of claim 15, wherein:
the sense circuit is configured to measure at least one measurement of an electrical difference across the resistive component; and the electrical difference comprises at least one of a voltage difference or a current difference.

17. The method of claim 15, wherein:
the sense circuit is configured to measure at least one measurement of an electrical difference across the resistive component and to provide the at least one control signal to the regulator based on the at least one measurement; and the at least one control signal comprises at least one of (a) a first instruction to provide the at least the portion of the second power signal to the power storage device or (b) a second instruction to provide an amount of the at least the portion of the second power signal to the power storage device.

18. The method of claim 15, wherein:
the first power signal comprises a first current;
the portion of the first power signal comprises a second current;
the sense circuit further comprises an amplifier;
the amplifier is configured to compare the first current and the second current and to provide an amplifier ratio signal based on a current relationship of the first current and the second current; and the logic unit is configured to receive the amplifier ratio signal and to provide the at least one control signal to the regulator based on at least the amplifier ratio signal.

19. The method of claim 15, wherein:
the logic unit comprises a microcontroller unit.

20. The method of claim 15 further comprising providing at least one status indicator configured to provide at least one indication of a status of the power storage device to a user of the electrical system.

21. A method of using an electrical system, the method comprising:
receiving a first power signal at a system input of the electrical system, the first power signal comprising a first voltage;

transmitting at least a first portion of the first power signal across a resistive component to a system output of the electrical system, the system output being coupled to an electronic device;

comparing an output voltage at the system output and a first reference voltage;

comparing the first voltage at the system input and a second reference voltage;

if the output voltage is greater than the first reference voltage, and based in part on a relationship of the first voltage and the second reference voltage, using at least a second portion of the first power signal to charge a power storage device while providing the at least the first portion of the first power signal to the electronic device; and if the first power signal received at the system input of the electrical system is interrupted, using the power storage device to provide a stored power signal to the system output.

22. The method of claim 21 further comprising:
if the output voltage is greater than the first reference voltage and if the first voltage is less than the second reference voltage, using at least the second portion of the first power signal to charge the power storage device while providing the at least the first portion of the first power signal to the electronic device.

23. The method of claim 21 further comprising:
if the output voltage is greater than the first reference voltage and if the first voltage is greater than the second reference voltage, using at least the second portion of the first power signal to charge the power storage device while providing the at least the first portion of the first power signal to the electronic device.

24. The method of claim 23 further comprising:
comparing an electrical difference across the resistive component; and if the output voltage is greater than the first reference voltage and if the first voltage is greater than the second reference voltage and if the electrical difference is greater than zero, using at least the second portion of the first power signal to charge the power storage device while providing the at least the first portion of the first power signal to the electronic device.

25. The method of claim 24 further comprising:
regulating the at least the second portion of the first power signal such that a current of the second portion of the first power signal does not exceed a difference of a first current at an input of the resistive component minus a second current at an output of the resistive component.

26. The method of claim 21 further comprising:
comparing an electrical difference across the resistive component; and if the output voltage is greater than the first reference voltage and if the electrical difference is greater than zero, using at least the second portion of the first power signal to charge the power storage device while providing the at least the first portion of the first power signal to the electronic device.

27. The method of claim 21 further comprising:
increasing the first voltage to a higher voltage to charge the power storage device.

28. The method of claim 21 wherein:
the method further comprises increasing the first voltage to a higher voltage to charge the power storage device;
the higher voltage is a voltage of the at least the second portion of the first power signal; and
the method further comprises regulating the at least the second portion of the first power signal provided to charge the power storage device.

29. The method of claim 28, wherein:
regulating the at least the second portion of the first power signal provided to charge the power storage device comprises at least one of (a) providing a first instruction to provide the at least the second portion of the first power signal to the power storage device or (b) providing a second instruction to provide an amount of the at least the second portion of the first power signal to the power storage device.

30. The method of claim 21, the method further comprising:
providing at least one indication of a status of the power storage device to a user of the electrical system.

31. The electrical system of claim 13 wherein:
the at least one status indicator comprises a light emitting diode.

32. The electrical system of claim 13 wherein:
the at least one status indicator is configured to indicate when the power storage device is receiving the at least the portion of the second power signal from the charger module.

33. The electrical system of claim 13 wherein:
the at least one status indicator is configured to indicate when the power storage device is outputting the third power signal.

34. The electrical system of claim 13 wherein:
the at least one status indicator is configured to indicate when the power storage device is fully charged.

35. The electrical system of claim 20 wherein:
the at least one status indicator comprises a light emitting diode.

36. The electrical system of claim 20 wherein:
the at least one status indicator is configured to indicate when the power storage device is receiving the at least the portion of the second power signal from the charger module.

37. The electrical system of claim 20 wherein:
the at least one status indicator is configured to indicate when the power storage device is outputting the third power signal.

38. The electrical system of claim 20 wherein:
the at least one status indicator is configured to indicate when the power storage device is fully charged.

* * * * *